(12) United States Patent
Marcath et al.

(10) Patent No.: US 8,763,740 B2
(45) Date of Patent: Jul. 1, 2014

(54) INTERIOR BODY TRIM ASSEMBLY WITH INTEGRATED PASSAGE FOR VEHICLE TRACTION BATTERY

(75) Inventors: Jason C. Marcath, Dearborn, MI (US); David Hayes, Northville, MI (US); Beth Ann Dalrymple, Livonia, MI (US); Thomas A. Wagner, Ann Arbor, MI (US); Jesus Cardoso, Allen Park, MI (US); Hsiao-An Hsieh, Troy, MI (US); Keith Kearney, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 13/613,643

(22) Filed: Sep. 13, 2012

(65) Prior Publication Data

US 2014/0069732 A1 Mar. 13, 2014

(51) Int. Cl.
*B60K 11/06* (2006.01)
*B60K 1/04* (2006.01)

(52) U.S. Cl.
USPC .......................................... 180/68.2; 180/68.5

(58) Field of Classification Search
CPC ........ B60K 11/00; B60K 11/06; B60K 11/08; B60R 16/04; H01M 10/50; H01M 10/5004; H01M 10/5016; H01M 10/5063; H01M 10/5067; H01M 10/5097; H01M 10/5095; H01M 10/5093

USPC ................... 180/68.1, 68.2, 68.5; 165/41, 42; 296/208, 193.05
See application file for complete search history.

(56) References Cited

U.S. PATENT DOCUMENTS

| | | | |
|---|---|---|---|
| 7,025,159 B2* | 4/2006 | Smith et al. | 180/68.1 |
| 7,044,537 B2 | 5/2006 | Schoemann et al. | |
| 7,819,172 B2 | 10/2010 | Otsuka et al. | |
| 7,905,307 B2* | 3/2011 | Kubota et al. | 180/68.1 |
| 7,963,831 B2* | 6/2011 | He et al. | 454/142 |
| 8,276,696 B2* | 10/2012 | Lucas | 180/68.2 |
| 8,556,017 B2* | 10/2013 | Kubota et al. | 180/68.5 |
| 2008/0085445 A1 | 4/2008 | Marukawa et al. | |
| 2010/0099019 A1* | 4/2010 | Nagata et al. | 429/120 |
| 2011/0074184 A1 | 3/2011 | Hashikawa et al. | |
| 2013/0168169 A1* | 7/2013 | Fujita et al. | 180/89.1 |

* cited by examiner

*Primary Examiner* — John Walters
(74) *Attorney, Agent, or Firm* — David B. Kelley; Brooks Kushman P.C.

(57) ABSTRACT

An interior body trim assembly includes a trim panel and a closure member. The trim panel has an indented panel portion with an outline of part of an outer boundary of a passage. The closure member meets the trim panel with a portion of the closure member extending over the indented panel portion. The portion of the closure member and the indented panel portion complete the outer boundary of the passage and thereby form the passage.

14 Claims, 5 Drawing Sheets

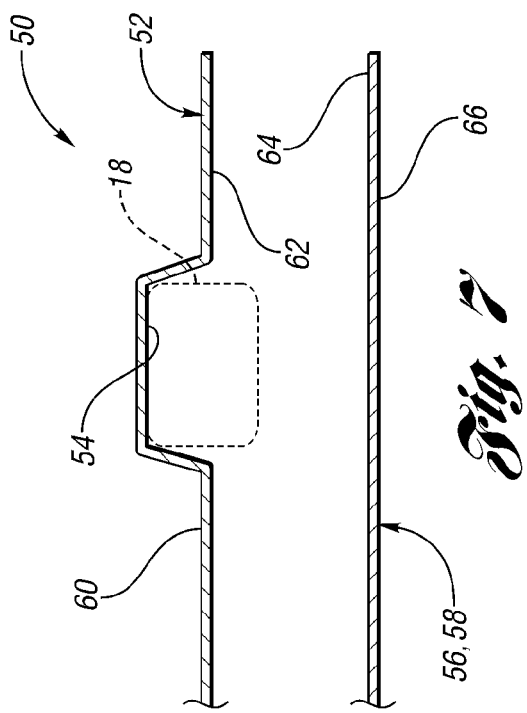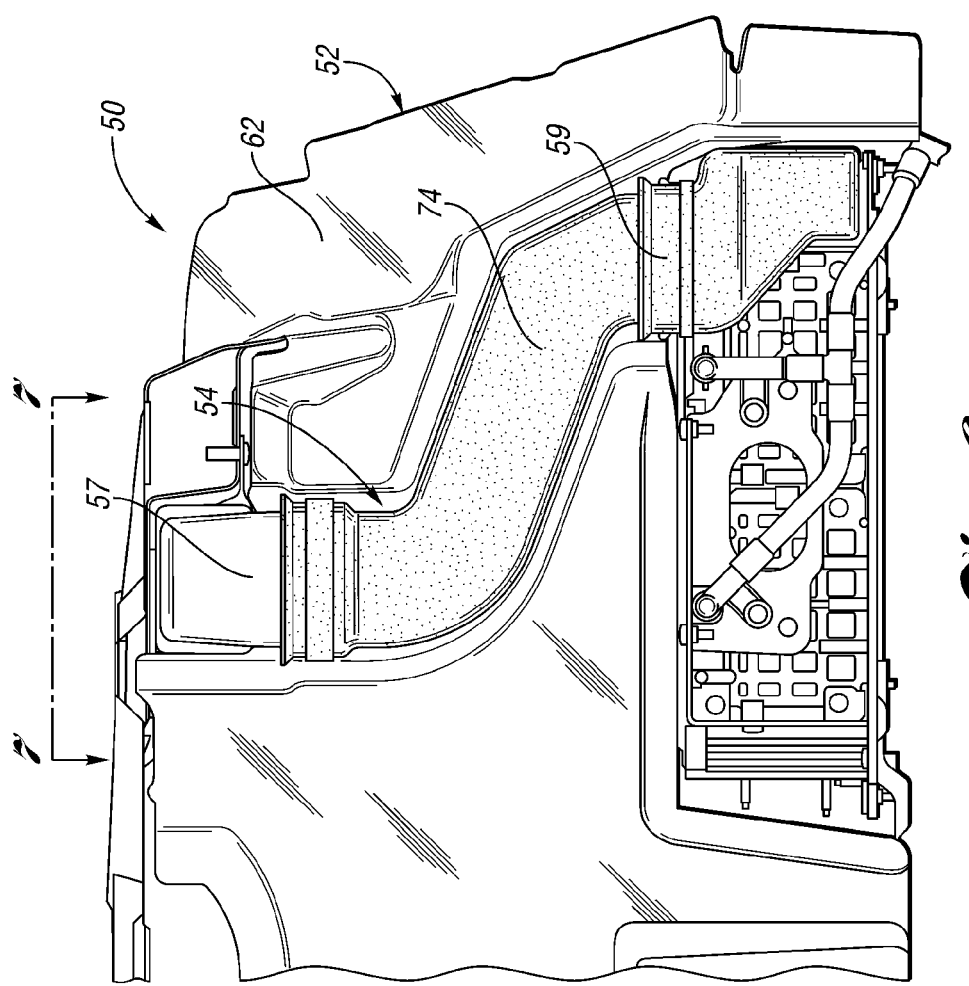

INTERIOR BODY TRIM ASSEMBLY WITH INTEGRATED PASSAGE FOR VEHICLE TRACTION BATTERY

TECHNICAL FIELD

The present invention relates to cooling a traction battery of a vehicle.

BACKGROUND

A vehicle traction battery produces heat when releasing and storing electric energy. Air from the vehicle cabin can be used to cool the battery. A duct is typically used to convey the air from the cabin to the battery. The duct may be covered with trim for appearance.

SUMMARY

Embodiments of the present invention are directed to a trim assembly having a passage integrated therein for a traction battery of a vehicle. The passage may be for conveying air from a passenger cabin of the vehicle to the traction battery to cool the traction battery. In these embodiments, the passage serves as an intake passage such as an intake duct leading to the traction battery. The trim assembly includes a trim panel which has an indented (i.e., concave, sunken, depressed, etc.) panel portion. The indented panel portion has the outline of part of the outer boundary of the passage.

The trim panel is configured to physically meet up against a closure member. In some embodiments, the closure member is a vehicle structure component such as a side of a portion of the vehicle body. In some embodiments, the closure member is an individual component such as a closure panel existing separately from the vehicle. The trim panel and the closure member physically meet with (i) part of the closure member extending over the indented panel portion and (ii) at least part of the remaining part of the closure member lying against at least part of the remaining portion of the trim panel. The portion of the closure member extending over the indented panel portion together with the indented panel portion complete the outer boundary of the passage and thereby form the passage. Thus, in some embodiments, the trim panel functions with a vehicle structure in the form of a closure member for forming the passage. In other embodiments, the trim assembly further includes a separate closure member component such as a closure panel and the trim panel and the closure panel function together for forming the passage.

In some embodiments, the trim assembly further includes a sealing structure. The sealing structure fits within and extends along the indented panel portion of the trim panel. In these embodiments, the sealing structure itself forms the outer boundary of the passage. Consequently, a closure member may be foregone in these embodiments.

Additional objects, features, and advantages of embodiments of the present invention will become more readily apparent from the following detailed description when taken in conjunction with the drawings, wherein like reference numerals refer to corresponding parts.

BRIEF DESCRIPTION OF THE DRAWINGS

FIG. 6 illustrates a frontal view of the interior body trim assembly as shown in FIG. 4 with the sealing structure fitted along the passage leading to the traction battery; and FIG. 7 illustrates an exploded top view of the interior body trim assembly in accordance with embodiments of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
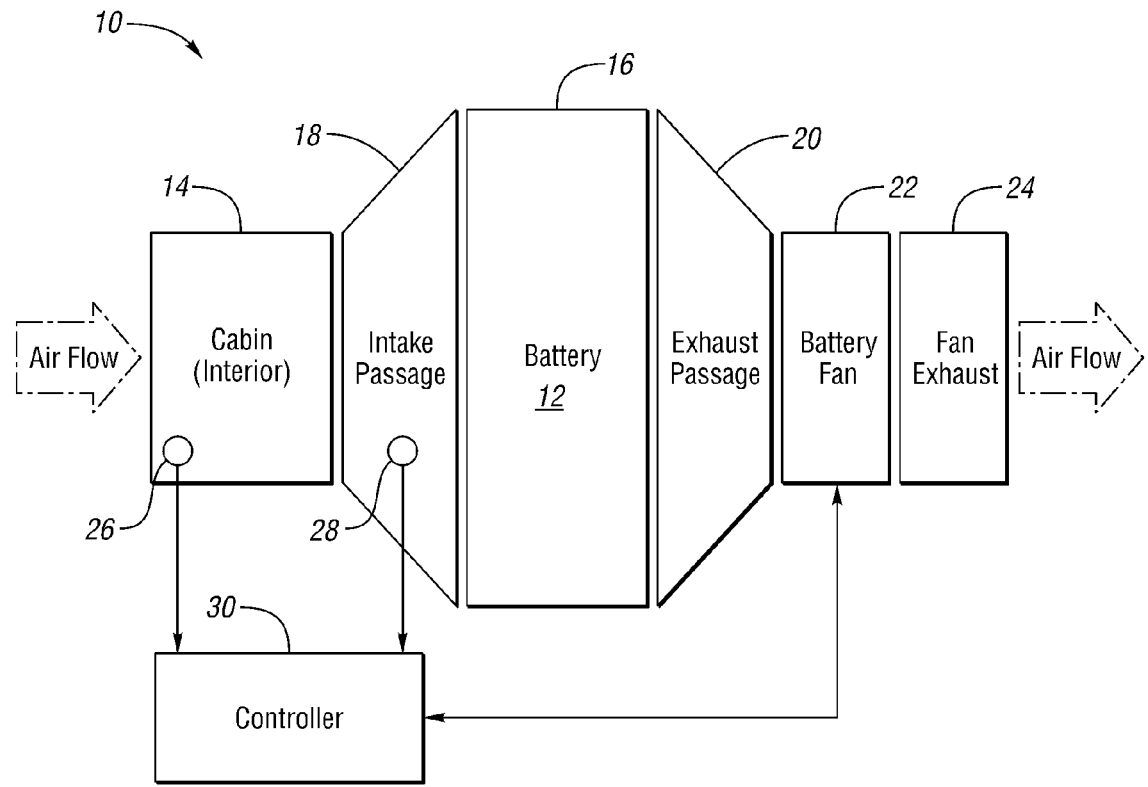
FIG. 1 illustrates a block diagram of a battery cooling system for a traction battery of a vehicle in accordance with an embodiment of the present invention.

Referring now to FIG. 1, a block diagram of a battery cooling system 10 for a traction battery 12 of a vehicle in accordance with an embodiment of the present invention is shown. The vehicle is an electric vehicle such as a hybrid electric vehicle (HEV), a battery-only electric vehicle (BEV), or the like. Battery 12 stores and releases electrical energy for driving the vehicle and thereby produces heat. Cooling system 10 provides thermal management of battery 12 to thereby improve battery performance and extend battery life.

The vehicle includes an interior passenger cabin or compartment 14. Vehicle occupants such as the driver and passengers sit in cabin 14. While the vehicle is being operated, cooling system 10 supplies air from cabin 14 to battery 12 to cool the battery. Cooling system 10 may supply air from the interior of cabin 14 to battery 12 without affecting the heating, ventilation, and air conditioning (HVAC) operations of the cabin. In general, air from cabin 14 enters an inlet port leading to battery 12, flows across and/or through the battery, and exits an outlet port leading out from the battery.

Cooling system 10 includes a battery case 16 for accommodating battery 12 therein. Battery 12 may include a plurality of unit cells or the like which are contained within battery case 16. Gaps are provided between adjacent unit cells and between the unit cells and the inner surface of battery case 16. The gaps serve for the passage of supplied air through battery 12 from one end to the other.

Cooling system 10 further includes an intake passage 18. Intake passage 18 is a duct, manifold, channel, inlet, opening, etc., through which air may pass. Intake passage 18 (i.e., intake duct 18) is upstream of battery 12 and is in fluid communication between cabin 14 and an inlet port of battery case 16. Cooling system 10 supplies inside air of cabin 14 into battery case 16 via intake passage 18 for cooling battery 12.

Cooling system 10 further includes an exhaust passage 20. Exhaust passage 20 is a duct, channel, outlet, opening, etc., through which air may pass. Exhaust passage 20 is downstream from battery 12 and is in fluid communication between an outlet port of battery case 16 and the exterior of the cabin 14, such as the exterior of the vehicle. Via exhaust passage 20, cooling system 10 exhausts air (now heated) from battery 12 that was supplied to battery 12 from cabin 14. The exhausted air is discharged from exhaust passage 20 to an exterior environment of cabin 14. Exhaust passage 20 may include an air circulation duct through which at least a portion of the air after cooling battery 12 returns to cabin 14.

Cooling system 10 further includes a fan 22 having a fan exhaust 24. In the embodiment shown in FIG. 1, fan 22 with fan exhaust 24 are located downstream of battery 12. Fan 22 may be located within exhaust passage 20 with fan exhaust 24 being an extension of exhaust passage 20. Fan 24 includes a suction port that is connected to (or a part of) exhaust passage 20. Fan 24 functions as an air supply system for supplying the air via intake passage 18 into battery case 16. When fan 24 is operated, the air inside battery case 16 is drawn, whereby the air inside cabin 14 is supplied across battery 12. The air after heat exchange with battery 12 is sent via exhaust passage 20 to fan 22 and discharged through fan exhaust 24 to, for instance, the exterior of cabin 14.

Figure 2:
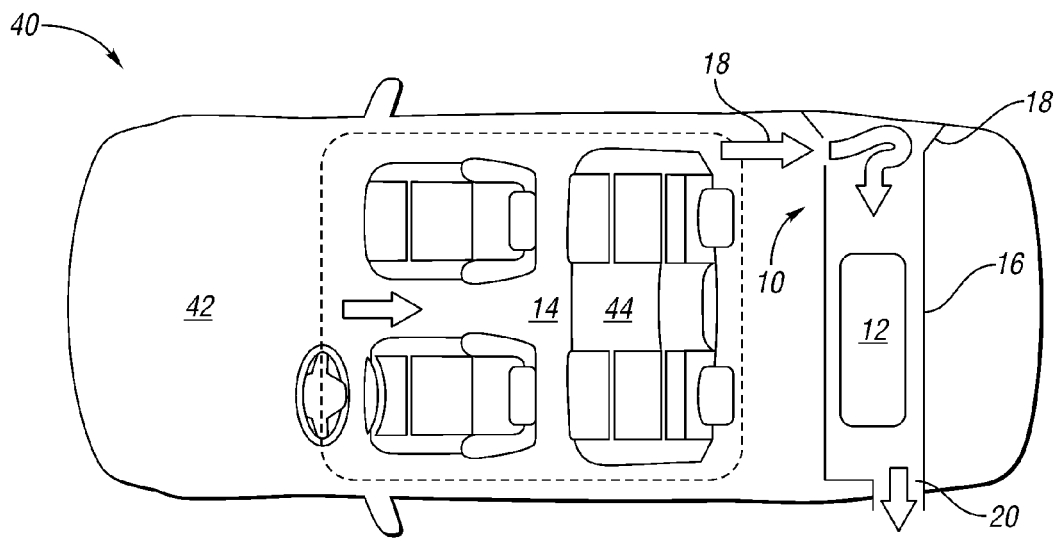
FIG. 2 illustrates a plan view of a vehicle having a traction battery and the battery cooling system.

Referring now to FIG. 2, with continual reference to FIG. 1, a plan view of a vehicle 40 having a traction battery 12 and battery cooling system 10 is shown. In this embodiment, vehicle 40 is a hybrid electric vehicle (HEV) having an engine which is arranged in an engine compartment 42 in the forward portion of the vehicle. In an alternative arrangement, vehicle 40 is another type of electric vehicle such as a battery-only electric vehicle (BEV), a plug-in hybrid electric vehicle (PHEV), or the like.

As an exemplary arrangement, battery cooling system 10 and battery 12 are arranged in the rearward portion of vehicle 40. For example, cooling system 10 and battery 12 are arranged in a space between a rear seat back 44, which is within cabin 14, and the trunk of the vehicle. Intake passage 18 is positioned adjacent a portion of the outer periphery of cabin 14 for receiving air of the cabin.

Referring now to FIGS. 3 through 6, with continual reference to FIGS. 1 and 2, an interior body trim assembly 50 having a passage integrated therein leading to traction battery 12 in accordance with embodiments of the present invention will now be described. In these embodiments, the passage is for conveying cooling air from cabin 14 to traction battery 12. As such, the passage serves as an intake passage 18 such as an intake duct leading to the inlet port of traction battery 12.

Interior body trim assembly 50 includes a trim panel 52. Trim panel 52 has an indented (i.e., concave, sunken, depressed, etc.) panel portion 54. Indented panel portion 54 has the outline of part of the outer boundary of intake passage 18 as shown in FIGS. 3 through 6.

Trim panel 52 is configured to meet with a closure member (the closure member not shown in FIGS. 3 through 6). In some embodiments, the closure member is part of the vehicle structure such as a side of a vehicle body portion 56 as shown in FIGS. 2 and 7. In some embodiments, the closure member is an individual component separate from the vehicle body such as a closure panel 58 as shown in FIG. 7.

Trim panel 52 and the closure member physically meet with a portion of the closure member extending over indented panel portion 54. The portion of the closure member extending over indented panel portion 54 together with indented panel portion 54 complete the outer boundary of the passage and thereby form intake passage 18. As such, intake passage 18 is integrated within trim assembly 50 by being formed by trim panel 52 and the closure member when trim panel 52 and the closure member are joined together. In some embodiments, the closure member is a vehicle body structure 56. Here, trim panel 52 functions with vehicle body structure 56 for forming intake passage 18. In other embodiments, trim assembly 50 includes a closure panel 58. Here, trim panel 52 and closure panel 58 operate together for forming intake passage 18.

Figure 3:
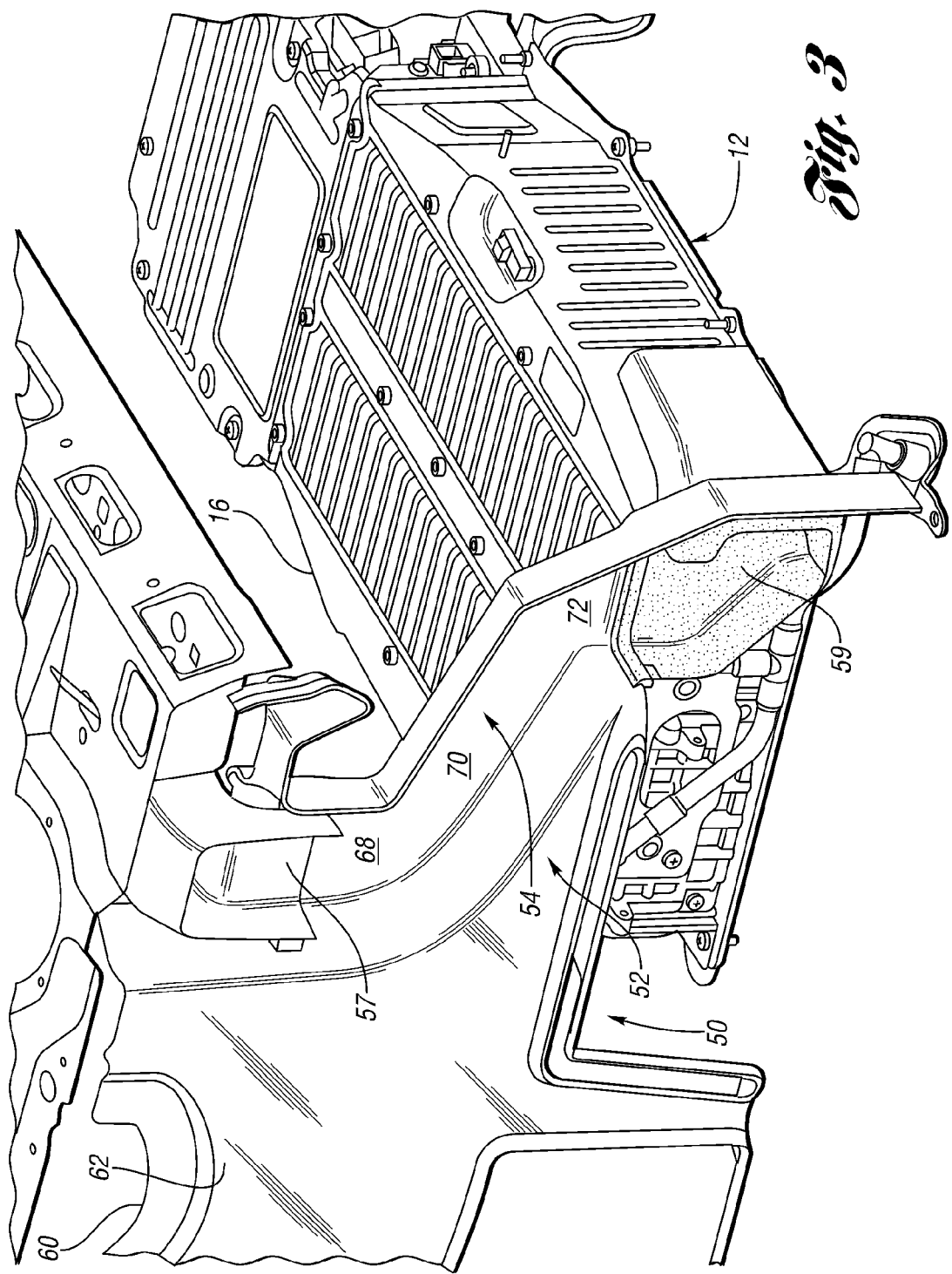
FIG. 3 illustrates an angled side view of an interior body trim assembly having a passage integrated therein leading to a traction battery in accordance with an embodiment of the present invention.
Figure 4:
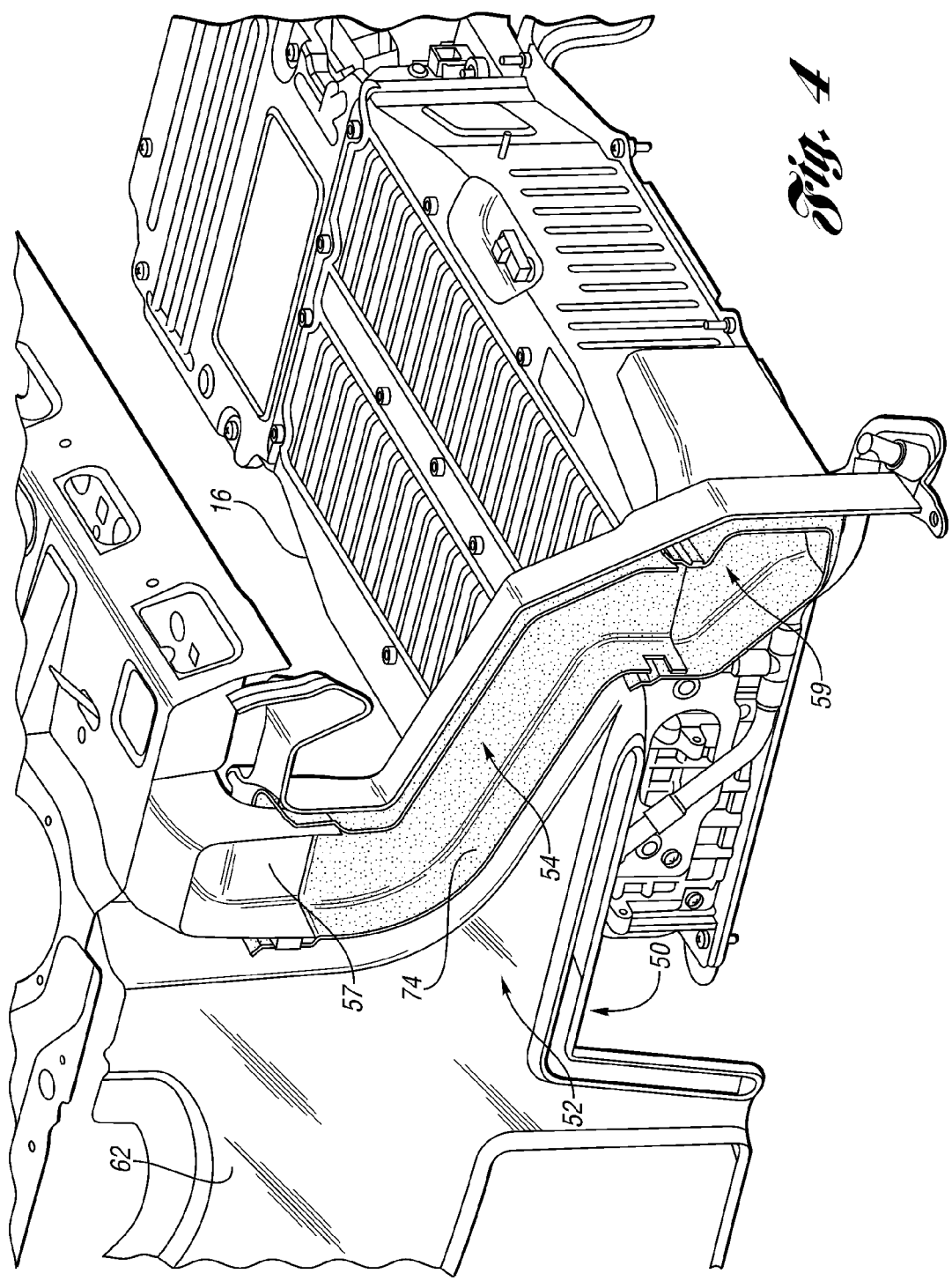
FIG. 4 illustrates an angled side view of the interior body trim assembly with a sealing structure fitted along the passage leading to the traction battery.
Figure 5:
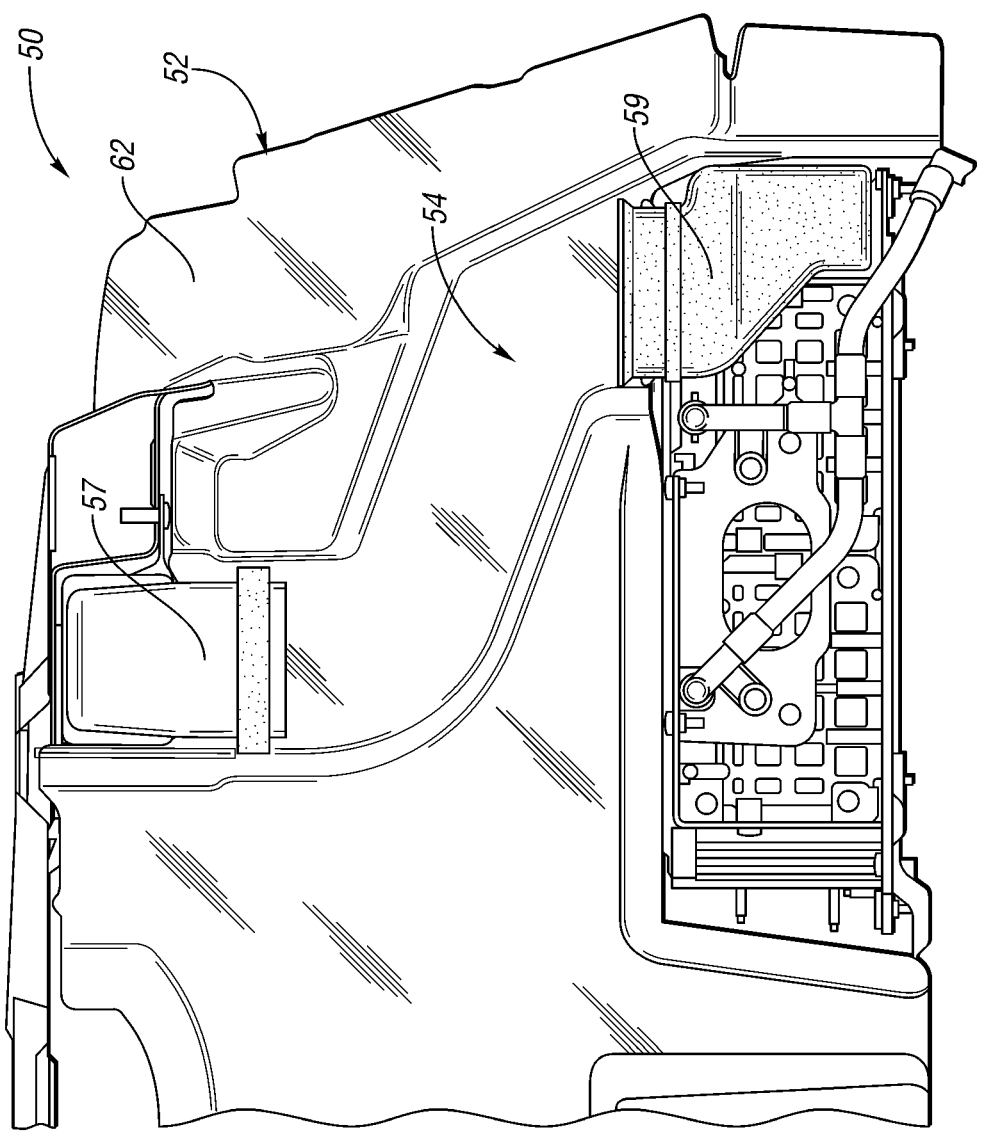
FIG. 5 illustrates a frontal view of the interior body trim assembly as shown in FIG. 3.

Intake passage 18 integrated within trim assembly 50 is disposed between an inlet port 57 for intake passage 18 and an inlet port 59 of battery case 16. Inlet port 57 for intake passage 18 and inlet port 58 of battery case 16 are end-piece duct-type structures. In FIGS. 3 and 4, inlet port 57 for intake passage 18 and inlet port 59 of battery case 16 are shown in cut-away sectional views. FIGS. 5 and 6 illustrate inlet port 57 for intake passage 18 and inlet port 59 of battery case 16 in full views.

Inlet port 57 for intake passage 18 is connected to a duct or the like (not shown) extending from passenger cabin 14 and leads into intake passage 18 when trim assembly 50 is operably incorporated in a vehicle. Inlet port 59 of battery case 16 leads from intake passage 18 into battery case 16 when trim assembly 50 is operably positioned adjacent battery case 16. As described above, air from cabin 14 enters inlet port 57 of intake passage 18, flows through intake passage 18 and enters inlet port 59 of battery case 16, flows across and/or through battery 12, and exits an outlet port (not shown) leading out from battery case 16.

With continual reference to FIGS. 3 through 6 and with reference to FIG. 7, trim panel 52 of trim assembly 50 has an inboard facing surface 60 and an outboard facing surface 62. The corresponding closure member (i.e., vehicle body portion 56 or closure panel 58) has an inboard side surface 64 and an outboard side surface 66. Outboard facing surface 62 of trim panel 52 and inboard side surface 64 of closure member 56, 58 define intake passage 18 integrated within trim assembly 50 when trim panel 52 and closure member 56, 58 are joined together. Inboard facing surface 60 of trim panel 52 may be covered with hard or soft trim for appearance (not shown).

In particular, trim panel 52 and closure member 56, 58 physically meet up against one another with part of closure member 56, 58 extending over indented panel portion 54 of trim panel 52 and at least part of the remaining part of closure member 56, 58 lying against at least part of the remaining portion of trim panel 52. The portion of closure member 56, 58 extending over indented panel portion 54 of trim panel 52 together with indented panel portion 54 complete the outer boundary of intake passage 18 and thereby form intake passage 18. As such, trim assembly 50 includes an intake passage 18 integrated therein with intake passage 18 being formed by indented panel portion 54 of trim panel 52 and closed on the opposite side by outboard side surface 64 of closure member 56, 58.

Trim panel 52 and/or closure panel 58 may be injection molded members. Trim panel 52 may be a unitary member. Alternatively, trim panel 52 may be formed of several individual pieces that are fixed together as a complete part. Trim panel 52 and closure member 56, 58 are separate pieces that are coupled together to form intake passage 18 integrated therein with a relatively tight airtight connection. The coupling between trim panel 52 and closure member 56, 58 may be formed by an adhesive, a sonic weld, and the like.

With reference to FIGS. 3 through 6, indented panel portion 54 of trim panel 52 includes an inlet passage section 68, a middle passage section 70, and an outlet passage section 72. Passage sections 68, 70, and 72 form the outline of intake passage 18. Passage sections 68, 70, and 72 are indented structures formed on outboard facing surface 62 of trim panel 52. As such, the portion of intake passage 18 on trim panel 52 is formed as an indented structure of trim panel 52. Middle passage section 70 extends between inlet and outlet passage sections 68 and 72. Inlet passage section 68 meets with inlet port 57 of intake passage 18. Outlet passage section 72 meets with inlet port 59 of battery case 16. Passage sections 68, 70, and 72 are configured to accommodate for the lateral (and longitudinal) displacement between inlet port 57 of intake passage 18 and inlet port 59 of battery case 16. Trim panel 52 may include a different configuration of passage sections to form the outline of integrated intake passage 18.

Trim assembly 50 may further include a sealing structure 74 (shown in FIGS. 4 and 6). In FIG. 4, sealing structure 74 is shown in a cut-away sectional view. FIG. 6 illustrates sealing structure 74 in a full view.

Sealing structure 74 fits within and runs along indented panel portion 54 of trim panel 52. As such, sealing structure 74 lays on indented panel portion 54 of outboard facing surface 62 of trim panel 52 that forms passage sections 68, 70, and 72. Sealing structure 74 connects at one end to inlet port 57 of intake passage 18 and at the other end to inlet port 59 of battery case 16. Sealing structure 74 itself forms the outer boundary of intake passage 18. Sealing structure 74 minimizes the leakage of hot air from battery 12 into cabin 14 or into the cool air chamber created by the intake passage/trim interface. As described, use of a closure member may be foregone with the use of sealing structure 74.

As described, interior body trim assembly 50 in accordance with some embodiments includes an intake passage 18 such as an intake duct integrated therein. As such, trim assembly 50 is associated with the intake side of battery 12. Of course, trim assembly 50 may be used in association with the exhaust side of battery 12. In this case, trim assembly 50 would be similarly configured as described herein but would include an exhaust passage integrated therein.

As further described, trim assembly 50 in accordance with some embodiments uses the interior trim to create an air passage for a traction battery 12 of a vehicle thereby eliminating the need to install a separate duct or the like for traction battery 12. That is, trim assembly 50 eliminates the need to install both of a separate passage and fasteners by integrating the passage into the trim (e.g., by integrating a duct into the trim). As described and illustrated herein, the inlet cooling duct (i.e., intake passage 18) is integrated with the interior trim (i.e., trim assembly 50) thereby eliminating the need to install a separate inlet cooling duct for the battery.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle comprising:
a passenger cabin;
a traction battery; and
a trim assembly including a closure member and a trim panel having an indented panel portion defining an outline of part of an outer boundary of a passage, wherein the trim panel and the closure member meet one another with a portion of the closure member extending over the indented panel portion, wherein the portion of the closure member and the indented panel portion define the outer boundary of the passage and thereby form the passage, wherein one end of the passage leads from a port connected to the passenger cabin and another end of the passage leads to a port connected to the traction battery, and wherein the passage is configured for conveying air from the passenger cabin to the traction battery;
wherein the trim panel includes trim on a surface thereof not meeting with the closure member.

2. The vehicle of claim 1 wherein:
the closure member is a closure panel that is connected to a vehicle body portion of the vehicle.

3. The vehicle of claim 1 wherein:
the closure member is a vehicle body portion of the vehicle.

4. The vehicle of claim 1 wherein:
the trim assembly further includes a sealing structure extending along the indented panel portion of the trim panel and fitting within the indented panel portion of the trim panel against the portion of the closure member extending over the indented panel portion of the trim panel.

5. An assembly comprising:
a trim panel having an indented panel portion defining an outline of part of an outer boundary of a passage; and
a closure member meeting the trim panel with a portion of the closure member extending over the indented panel portion, wherein the portion of the closure member and the indented panel portion define the outer boundary of the passage and thereby form the passage;
wherein at least part of the closure member other than the portion of the closure member lies against at least part of the trim panel other than the indented panel portion of the trim panel.

6. The assembly of claim 5 wherein:
the trim panel is positioned such that one end of the passage leads from a port connected to a passenger cabin of a vehicle and another end of the passage leads to a port connected to a traction battery whereby the passage is configured for conveying air from the passenger cabin to the traction battery.

7. The assembly of claim 5 wherein:
the closure member is a closure panel.

8. The assembly of claim 5 wherein:
the closure member is a vehicle body portion.

9. The assembly of claim 5 further comprising:
a sealing structure extending along the indented panel portion of the trim panel and fitting within the indented panel portion of the trim panel against the portion of the closure member extending over the indented panel portion of the trim panel.

10. The assembly of claim 5 wherein:
at least one of the trim panel and the closure member is an injection molded member.

11. The assembly of claim 5 wherein:
the trim panel is a unitary member.

12. The assembly of claim 5 wherein:
the trim panel is formed of several individual pieces that are fixed together as a complete part.

13. The assembly of claim 5 wherein:
the trim panel and the closure member are separate pieces that meet together to form the passage.

14. An assembly comprising:
a trim panel having an indented panel portion defining part of an outer boundary of a passage; and
a closure member meeting the trim panel with a portion of the closure member extending over the indented portion, wherein the closure member portion and the indented portion define the passage outer boundary and thereby form the passage;

wherein the trim panel includes trim on a surface thereof not meeting with the closure member.

* * * * *